US011681666B2

(12) United States Patent
Efimov

(10) Patent No.: US 11,681,666 B2
(45) Date of Patent: Jun. 20, 2023

(54) "BOUNCING" IO PATTERN FOR REPLICATION PROTOCOLS

(71) Applicant: Oracle International Corporation, Redwood Shores, CA (US)

(72) Inventor: Andrey Efimov, Monroe, WA (US)

(73) Assignee: Oracle International Corporation, Redwood Shores, CA (US)

( * ) Notice: Subject to any disclaimer, the term of this patent is extended or adjusted under 35 U.S.C. 154(b) by 290 days.

(21) Appl. No.: 17/007,972

(22) Filed: Aug. 31, 2020

(65) Prior Publication Data

US 2022/0066996 A1    Mar. 3, 2022

(51) Int. Cl.
  *G06F 16/18* (2019.01)
  *G06F 16/182* (2019.01)
  *G06F 3/06* (2006.01)

(52) U.S. Cl.
  CPC .......... *G06F 16/184* (2019.01); *G06F 3/0604* (2013.01); *G06F 3/065* (2013.01); *G06F 3/067* (2013.01); *G06F 3/0655* (2013.01)

(58) Field of Classification Search
  CPC .................................................. G06F 16/184
  See application file for complete search history.

(56) References Cited

U.S. PATENT DOCUMENTS

| 8,280,917 B1 * | 10/2012 | Wei | G06F 16/958 |
| | | | 707/802 |
| 8,850,073 B1 * | 9/2014 | Wilkes | G06F 11/2066 |
| | | | 709/248 |
| 9,591,101 B2 * | 3/2017 | Word | H04L 67/01 |

OTHER PUBLICATIONS

Friedman et al., Adaptive Batching for Replicated Servers, 25th Institute of Electrical and Electronics Engineers Symposium on Reliable Distributed Systems (SRDS'06), 2006, 10 pages.

* cited by examiner

*Primary Examiner* — Baoquoc N To
(74) *Attorney, Agent, or Firm* — Kilpatrick Townsend & Stockton LLP

(57) ABSTRACT

Systems and methods for a bouncing replication protocol are described herein. The system can include a replication cluster including a plurality of servers and a master controller that can receive a first request to replicate a first transaction and execute a batching process to replicate the first transaction. The batching process can include selecting a first server for replication of the first transaction, determining that a pending acknowledgement from the selected first server has not been identified, adding the first transaction to a first batch for the first server, and sending the first batch including only the first transaction. The master controller can receive a second request to replicate a second transaction, execute the batching process with the master controller to replicate the second transaction, which executing of the batching process includes adding the second transaction to a second batch including a plurality of transactions, receive an acknowledgement indicative of completion of replication, and send the second batch upon receipt of the acknowledgement indicative of completion of replication.

20 Claims, 10 Drawing Sheets

"BOUNCING" IO PATTERN FOR REPLICATION PROTOCOLS

TECHNICAL FIELD

The present disclosure relates generally to computing, and more particularly to techniques for data replication.

BACKGROUND

Replication is a process of copying and maintaining database objects, such as tables, in multiple databases that make up a distributed database system. Changes applied at one site can be captured and stored locally before being forwarded and applied at other locations.

Replication can be used with a variety of applications and in a variety of environments. These different applications and environments can often have different requirements. For example, some applications allow for relatively autonomous individual snapshot sites, and other mass deployment applications typically require data to be periodically synchronized between central database systems and a large number of small, remote sites, which are often disconnected from the central database.

For example, individual members of a sales force are an example of an application typically requiring relatively autonomous individual snapshot sites. Specifically, members of a sales force must be able to complete transactions, regardless of whether they are connected to the central database. In this case, remote sites must be autonomous.

On the other hand, applications such as call centers and Internet systems require data on multiple servers to be synchronized in a continuous, nearly instantaneous manner to ensure that the service provided is available and equivalent at all times. For example, a retail web site on the Internet must ensure that customers see the same information in the online catalog at each site. Here, data consistency is more important than site autonomy.

To continue the applicability and usefulness of replication, further improvements are desired.

BRIEF SUMMARY

Various embodiments are described herein, including methods, systems, non-transitory computer-readable storage media storing programs, code, or instructions executable by one or more processors, and the like.

One aspect of the present disclosure relates to a method of, for example, batch processing. In some the method can include receiving a first request to replicate a first transaction at a master controller from a replication requestor and executing a batching process with the master controller to replicate the first transaction on at least some of a plurality of servers in a replication cluster. The batching process can include selecting with the master controller a first server for replication of the first transaction from the replication cluster, determining that a pending acknowledgement from the selected first server has not been identified, adding the first transaction to a new first batch for the first server, and sending the first batch to the first server selected for replication of the first transaction, wherein the first transaction is an only transaction in the first batch. The method can include receiving a second request to replicate a second transaction at the master controller, executing the batching process with the master controller to replicate the second transaction on at least some of the plurality of servers in the replication cluster, which executing of the batching process to replicate the second transaction on at least some of the plurality of servers in the replication cluster can include adding the second transaction to a second batch for the first server, the second batch including a plurality of transactions, receiving with the master controller an acknowledgement indicative of completion of replication from each of the at least some of the plurality of servers in the replication cluster, and sending the second batch, which sending of the second batch can be triggered by receipt of the acknowledgement indicative of completion of replication.

In some embodiments, the method can include sending with the master controller a response to the replication requestor indicating completion of the replication. In some embodiments, the method can include determining completion of the replication when a value associated with the received acknowledgment indicative of completion of replication meets or exceeds a threshold value. In some embodiments, the batching process is executed by the master controller for each of the plurality of servers in the replication cluster. In some embodiments, executing the batching process causes the master controller to, for each of the plurality of servers in the replication cluster, send the first transaction in a batch to each of the plurality of servers in the replication cluster. In some embodiments, at least some of the batches sent to different servers in the plurality of servers in the replication cluster are non-identical.

In some embodiments, the method includes determining that no current unsent batch is available for the first server, and creating the first batch for the first server. In some embodiments, the plurality of transactions included in the second batch are received subsequent to the sending of the first batch to the first server selected for replication of the first transaction. In some embodiments, the batching process for the second request further includes selecting with the master controller the first server for replication of the second transaction from the replication cluster, determining that an acknowledgement of completion of previous batch processing has been received from the selected first server, and identifying the second batch for the first server, which second batch includes a current unsent batch.

In some embodiments, a size of the second batch varies based on a timing of receipt of the acknowledgement indicative of completion of replication. In some embodiments, the second batch is not full when sent to the first server. In some embodiments, adding the second transaction to the second batch for the first server includes determining that the adding of the second transaction to the second batch does not increase a size of the second batch beyond a maximum size. In some embodiments, adding the second transaction to the second batch for the first server includes identifying a maximum size for the second batch, identifying the size of the second batch after the adding of the second transaction, determining that the adding of the second transaction to the second batch does not exceed the maximum size for the second batch, and adding the second transaction to the second batch. In some embodiments, identifying the maximum size for the second batch includes retrieving information identifying a maximum batch size for the first server. In some embodiments, identifying the maximum size for the second batch includes determining a hardware attribute of the first server, and identifying a maximum batch size based on the hardware attribute of the first server. In some embodiments, the hardware attribute can be an amount of random access memory of the first server.

In some embodiments, the master controller is a subsystem within one of the plurality of servers in the replication cluster. In some embodiments, the first server can be the one of the plurality of servers in the replication cluster containing the master controller.

One aspect of the present disclosure relates to a non-transitory computer-readable storage medium storing a plurality of instructions executable by one or more processors. In some embodiments, the plurality of instructions when executed by the one or more processors cause the one or more processors to receive a first request to replicate a first transaction at a master controller from a replication requestor, and execute a batching process with the master controller to replicate the first transaction on at least some of a plurality of servers in a replication cluster. In some embodiments, the batching process includes selecting with the master controller a first server for replication of the first transaction from the replication cluster, determining that a pending acknowledgement from the selected first server has not been identified, adding the first transaction to a new first batch for the first server, and sending the first batch to the first server selected for replication of the first transaction, wherein the first transaction is an only transaction in the first batch. The plurality of instructions when executed by the one or more processors cause the one or more processors to receive a second request to replicate a second transaction at the master controller, execute the batching process with the master controller to replicate the second transaction on at least some of the plurality of servers in the replication cluster, which executing of the batching process to replicate the second transaction on at least some of the plurality of servers in the replication cluster includes adding the second transaction to a second batch for the first server, the second batch including a plurality of transactions, receive with the master controller an acknowledgement indicative of completion of replication from each of the at least some of the plurality of servers in the replication cluster, and send the second batch, wherein the sending of the second batch is triggered by receipt of the acknowledgement indicative of completion of replication.

One aspect of the present disclosure relates to a system including a replication cluster including a plurality of servers and a master controller. The master controller can receive a first request to replicate a first transaction from a replication requestor, and execute a batching process to replicate the first transaction on at least some of the plurality of servers in the replication cluster. The batching process can include selecting a first server for replication of the first transaction from the replication cluster, determining that a pending acknowledgement from the selected first server has not been identified, adding the first transaction to a first batch for the first server, and sending the first batch to the first server selected for replication of the first transaction, wherein the first transaction is an only transaction in the first batch. The master controller can receive a second request to replicate a second transaction at the master controller, execute the batching process with the master controller to replicate the second transaction on at least some of the plurality of servers in the replication cluster, which executing of the batching process to replicate the second transaction on at least some of the plurality of servers in the replication cluster comprises adding the second transaction to a second batch for the first server, the second batch including a plurality of transactions, receive an acknowledgement indicative of completion of replication from each of the at least some of the plurality of servers in the replication cluster, and send the second batch, wherein the sending of the second batch is triggered by receipt of the acknowledgement indicative of completion of replication.

The foregoing, together with other features and embodiments will become more apparent upon referring to the following specification, claims, and accompanying drawings.

DETAILED DESCRIPTION

Figure 1:
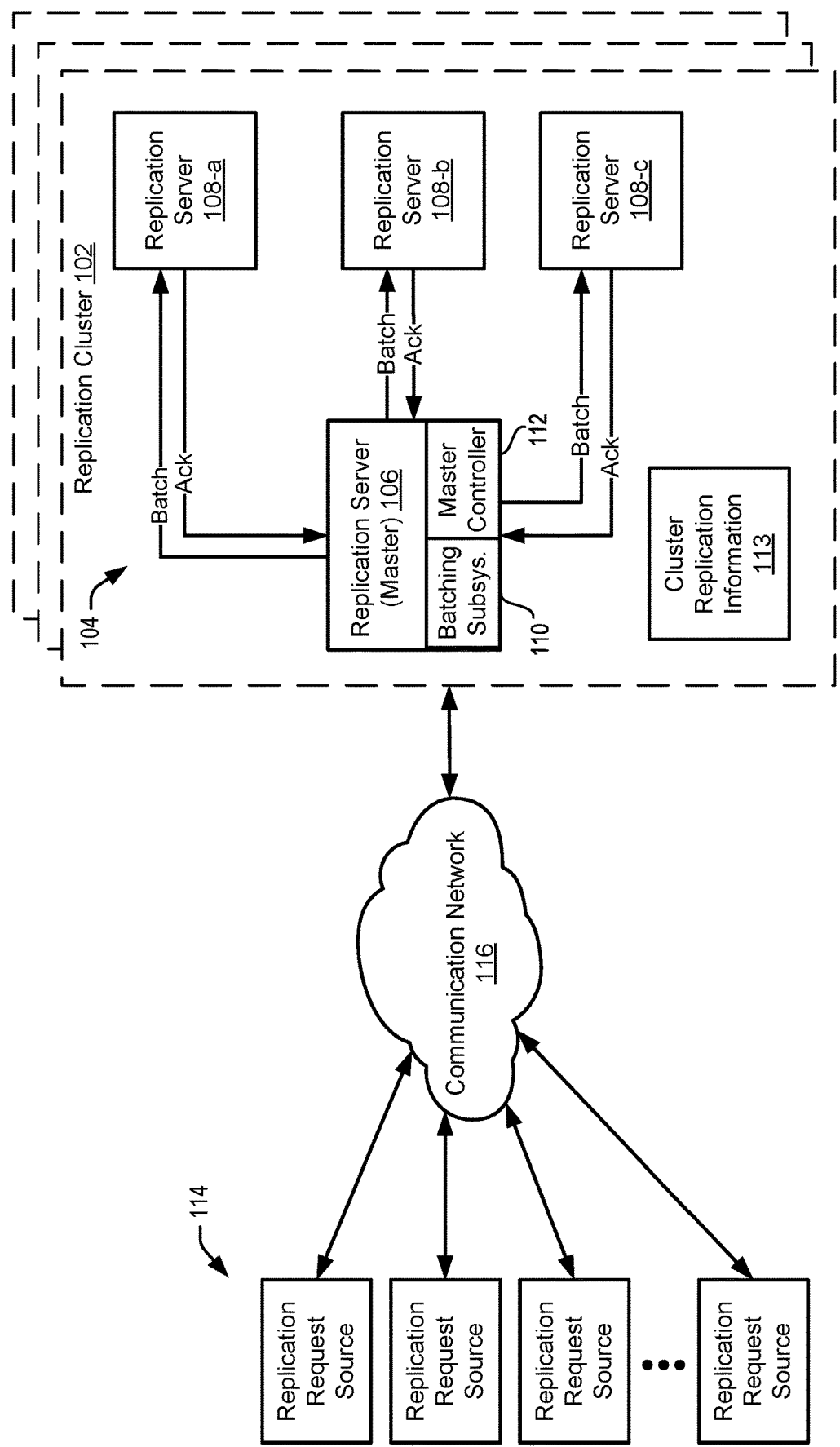
FIG. 1 is a schematic illustration of one embodiment of a system for replication.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Data replication provides the ability to have multiple exact copies of a data set stored in multiple locations. This replications is beneficial as it decreases risks associated with data loss or data corruption as multiple exact copies of the data are separately stored. Further, having data stored in different locations can provide the benefit of increasing the speed with which that data can be accessed.

Two achieve these benefits, replicated data should be (1) consistent in that the replicas are identical, and (2) readily available—in other words, stored at multiple locations. In some embodiments, this consistency can include that replication is performed according to a strict consistency standard. To be assured of achieving these conditions, a confirmation or acknowledgement is received from a device where a replica is being created/stored. This confirmation can indicate that an accurate replica has been successfully created and/or stored.

In addition to consistency in the replicated data itself, it can be desirable to maintain consistency of logs of replicating devices, such that the logs of the replicating devices are identical, or at least that entries in the log with respect to replication transactions are identical and in the same order.

Many techniques are used in order to achieve this consistency in logs, including (1) pipelining, and (2) batching.

In pipelining, a virtual queue of replications requests is created at each replicating device. These replication requests in the queue are maintained in the same order, and are processed/replicated in that order. By maintaining this strict order of replication requests, In batching, requests are accumulated into a single batch, which corresponds to a single log record, and this batch is then sent and processed as a batch. Batching is typically controlled by either, having a fixed batch size and sending the batch when that size is reached, or sending the batch at a certain time interval. In some instances, these batching techniques can be combined. However, each of these batching techniques provides certain benefits and drawbacks.

The present disclosure relates to techniques for variable size batching to optimize batching and/or to maximize system efficiency. These techniques maximize batching efficiency by maintaining operation of the replication devices, also referred to herein as replication servers. Specifically, a batch is formed during the time in which a previously sent batch is being replicated, and the batch being formed is finalized and sent upon receipt of a confirmation or acknowledgement of completion of the replication of the previously sent batch. Thus, the size of each batch varies based on the amount of time spent processing and/or replicating the previously sent batch and the rate of received transactions during this time spent processing and/or replicating the previously sent batch.

Application of batching techniques as disclosed herein provide several specific benefits, specifically decreasing latency in replication operations and increasing system efficiency. These benefits are achieved in part because, over a broad range of batch sizes, the processing time to successfully replicate the transactions in the batch is non-linear, and frequently is approximately constant. Due to this non-linearity and/or approximate constancy of the time to successfully replicate the transactions in the batch, overall replication efficiency can be improved by decreasing the time in which no replication is actively taking place, in other words to maximize the time that replication servers are processing batches and creating replicas.

In some embodiments, this can result in a batch being sent with only a single transaction. Such a single transaction batch can occur when the replication request is received after the receipt of the confirmation of completion of replication of an immediately prior batch, and before receipt of any other replication requests. Such a single transaction batch can occur when a single transaction is placed into a batch, and the confirmation of completion of replication of the immediately prior batch is received before any additional replication request is received.

In a similar manner, if a large number of replication requests is received before receipt of the acknowledgement of completion of replication of the immediately prior batch, then this large number of replication requests can form a large next batch, which next batch can be finalized and sent upon receipt of that acknowledgement of completion of replication of the immediately prior batch. Thus, the size of the batches can vary based on the rate of receipt of replication requests and the timing of the receipt of the acknowledgement of completion of replication of the immediately prior batch.

With reference now to FIG. 1, a schematic illustration of one embodiment of a system 100 for replication. The system 100 can include a replication cluster 102 that can include a plurality of replication devices 104, also referred to herein as replication servers 104. Each of these replication devices 104 can form a node within the replication cluster.

In some embodiments, the replication devices 104 can be physical devices such as, for example, a one or several servers, and in some embodiments, the replication devices 104 can be one or several virtual devices such as, for example, one or several virtual machines. In some embodiments, these one or several virtual machines can be instantiated within one or several hardware environments such as within one or several servers.

In some embodiments, the replication servers 104 can include a master replication server 106 and one or several slave replication servers 108. The master replication server 106 can include a batching subsystem 110 and a master controller 112. In some embodiments, one or both of the batching subsystem 110 and the master controller 112 can be a subsystem of one of the replication servers 104 within the replication cluster 102, and specifically can be a subsystem of the master replication server 106. In some embodiments, the master replication server 106 remains constant, and in some embodiments, the master replication server 106 can change. Thus, in some embodiments, the master replication server 106 is a role that can be fulfilled by one of the replication servers 104 within the replication cluster 102, but the replication server 104 fulfilling this role can change over time.

The batching subsystem 110 can create batches and/or manage the batching process. The batching subsystem 110 can be a component within the master replication server 106 and can be embodied in hardware or in software.

The master controller 112 can manage the replication server 104 within the replication cluster 102. In some embodiments, this can include receiving replication requests, selecting one or several replication servers 104 to replicate the transaction in the replication request, sending the transaction in a batch to these selected replication servers 104, receiving, from each of the replication servers receiving the transaction, confirmation of completion of the replication, and responding to the replication requestor and indicating the completion of the replication. In some embodiments, the master controller 112 can select the master replication server 106 as one of the replication servers 104 to receive the transaction for replication.

The system 100 can include a plurality of replication request sources 114, also referred to herein as replication requestors 114. The replication requestors 114 can request the replication of the one or several transactions. The replication requestors 114 can communicate with the replication cluster 102 via the communication network 116. The communication network can comprise a wired and/or wireless communication network communicatingly connecting the replication cluster 102 and one or several of the replication request sources 114.

The replication cluster 102 can further include cluster replication information 113. This information can, for example, include various parameters relating to replication operation and/or to the replication cluster 102. This information can include, for example, information identifying the master replication server 106, identifying a maximum batch size, or the like. The cluster replication information 113 can, in some embodiments, be accessible by one or several of the replication servers 104.

Requests for replication can be sent from the replication requestors 114 to the replication cluster 102 via the communication network 116. In some embodiments, upon completion of the replication, the replication requestor 114 can receive a confirmation of completion of the replication.

This confirmation can be received from the replication cluster 102, and specifically can be received from the master replication server 106, and more specifically from the master controller 112 of the master replication server 106.

Figure 2:
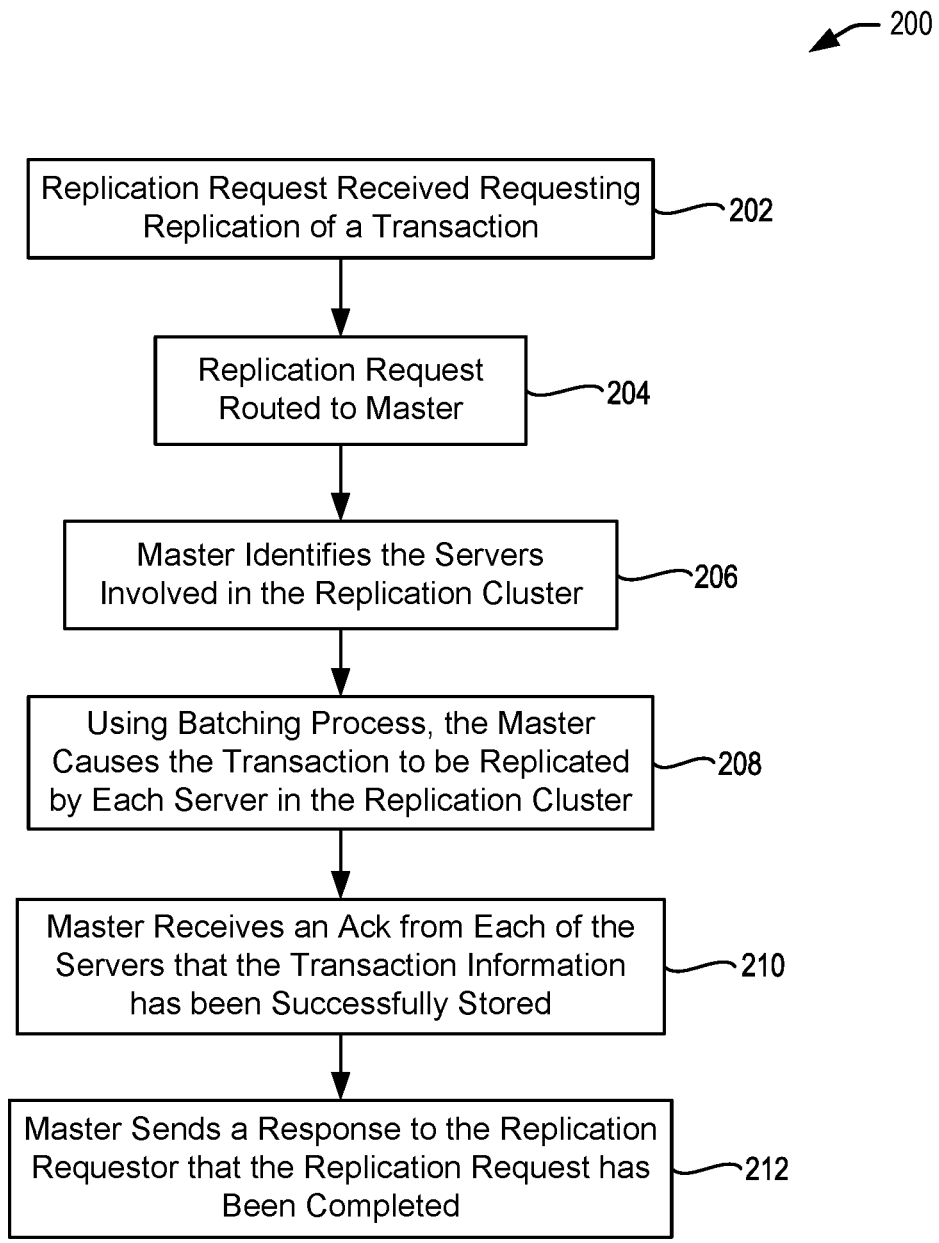
FIG. 2 is a flowchart illustrating one embodiment of a process for replication.

With reference now to FIG. 2, a flowchart illustrating one embodiment of a process 200 for replication. The process 200 can be performed by all or portions of the system 100, and can be specifically performed by the replication cluster 102. In some embodiments, the process 200 can be performed by the master replication server 106, and more specifically by the master controller 112 and the batching subsystem 110 of the master replication server 106. The process 200 begins at block 202, wherein a replication request is received, the replication request requesting replication of a transaction. In some embodiments, the transaction can be included in the replication request, can be associated with the replication request, and/or can be identified by the replication request. The replication request can further include information identifying one or several attributes of the requested replication. This can include, for example, the number of replicas to be created within the replication cluster 102, attributes of replication servers 104 on which the replicas can be created, conditions for determining successful completion of the replication request, or the like. The replication request can be received by the replication cluster 102 from a replication requestor 114.

At block 204, the replication request is routed to the master replication server 106, and specifically to the master controller 112. In some embodiments, this can include retrieving information identifying the master replication server 106 from the cluster replication information 114, and then identifying, based on the cluster replication information 113, the master replication server 106 within the replication cluster 102. Once the master replication server 106 is identified, the replication request can be routed to the master controller 112 which can reside within the master replication server 106.

At block 206, the master controller 112 identifies the servers 106, 108 in the replication cluster 102, which servers 106, 108 involved in the replication cluster. In some embodiments, this identification of servers 106, 108 includes identifying and/or selecting one or several servers within the replication cluster 102 for replication of the transaction. In some embodiments, this can include identifying and/or selecting one or several of the slave replication servers 108 and/or identifying and/or selecting the master replication server 106. In some embodiments, the one or several replication servers 104 can be identified based on information contained within the replication request and/or information relating to the performance of the replication servers 104, such as, for example, information identifying one or several replication servers 104 in the replication cluster as non-functional. In some embodiments, all of the replication servers 104 within the replication cluster 102, and specifically, all of the functioning replication servers 104 within the replication cluster 102 can be selected.

At block 208, a batching process is executed to create and send a batch containing at least the transaction to each of the replication servers 104 identified for replication of the transaction to thereby replicate the transaction received with the replication request in block 202 on at least some of the replication servers 104 in the replication cluster 102. In some embodiments, this can include adding the transaction to an existing batch or creating a new batch and adding the transaction to the new batch. In some embodiments, this can further include sending of the batch to one or several of the replication servers 104. In some embodiments, the batching process can be executed for all of the replication servers 104 selected for replication of the transaction, which can, in some embodiments, include each of the replication servers 104 in the replication cluster. In some embodiments, for example, a common batch can be sent to all of the selected replication servers 104, which can include sending the transaction to each of the replication servers 104 in the replication cluster. In some embodiments, the sending of a common batch to all of the selected replication servers 104 can facilitate creation of a common log, or in other words, can facilitate in creating circumstances in which the replication servers 104 of the replication cluster 102 have corresponding and/or identical logs.

In some embodiments, one or several unique batches can be sent to one or several of the selected replication servers 104, which can include sending one or several unique batches to each of the replication servers 104 in the replication cluster 102. Thus, in some embodiments, at least some of the batches sent to the selected replication servers 104 in the replication cluster 102 can be non-identical.

After the batch has been sent to the selected replication servers 104, the process 200 proceeds to block 210, wherein the master receives acknowledgements from the selected replication servers 104. In some embodiments, some or all of the selected replication servers 104 sends an acknowledgement, which acknowledgement confirms completion of the requested replication of the transaction, and more specifically confirms completion of the replication of the transactions contained within the batch. Thus, this acknowledgement confirms that the replication server 104 that is the sources of the acknowledgement has successfully completed the replication and thus has successfully stored transaction information. The master controller 112 receives these acknowledgements and tracks the received acknowledgements. In some embodiments, the tracking of these acknowledgements can include generating a value representing the number of successfully completed replications of the batch and/or transaction and comparing this number to a threshold value. In some embodiments, this threshold value can be identified in the cluster replication information 113.

When the value representing the number of successfully completed replications of the batch and/or of the transaction meets and/or exceeds this threshold value, then the master controller 112 can determine that the replication has been successfully completed. When the replication has been successfully completed, the master controller 112 can, as indicated in block 212, send a response to the replication requestor, which response can indicate that the replication request has been successfully completed.

Figure 3:
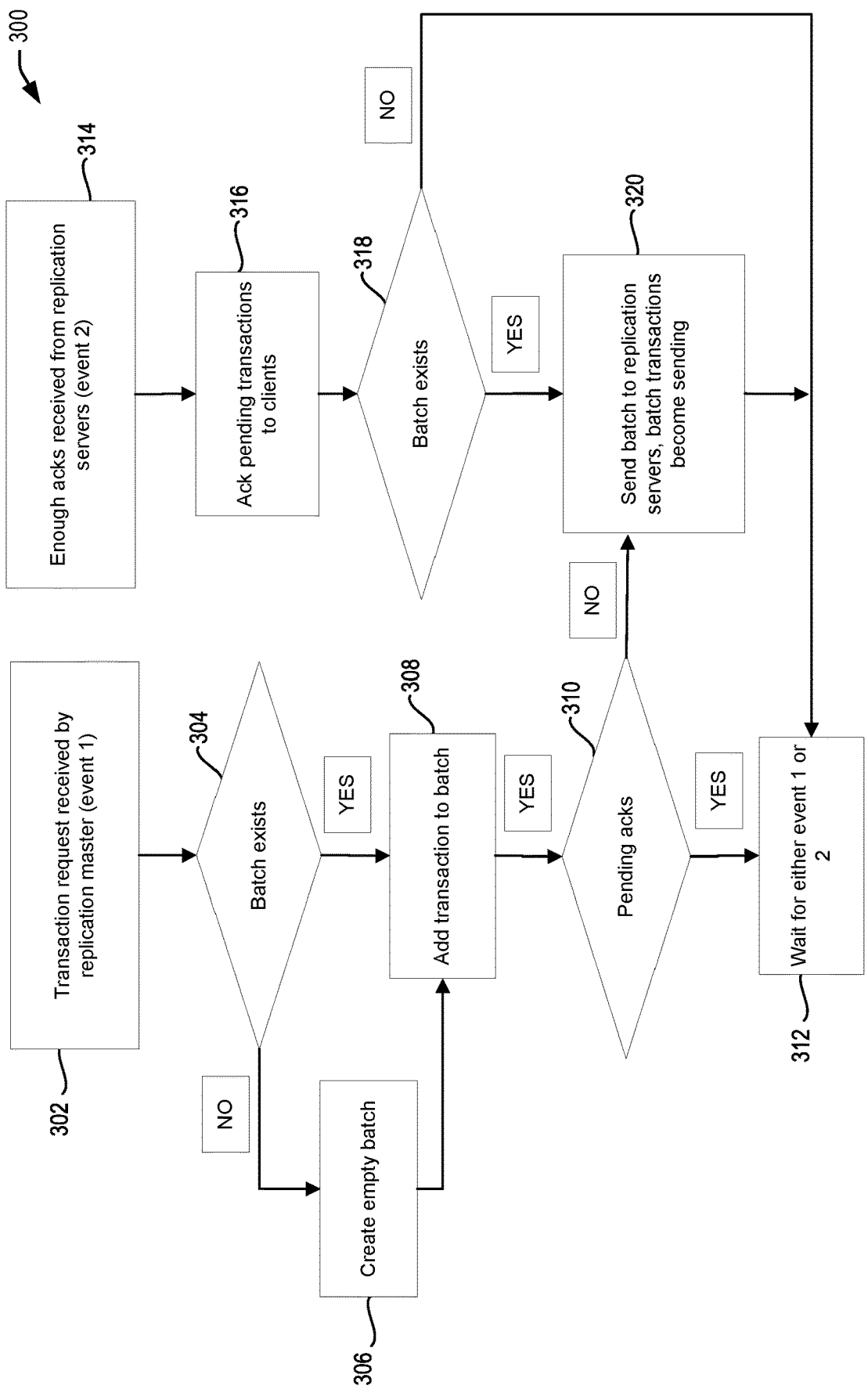
FIG. 3 is a flowchart illustrating one embodiment of a process for batch-based replication.

With reference now to FIG. 3, a flowchart illustrating one embodiment of a process 300 for batch-based replication is shown. The process 300 can be performed as a part of, or in the place of some or all of steps 204 through 212 of process 200 shown in FIG. 2. Further, the process 300 can be performed by the system 100, including by, for example, the replication cluster 102, the master replication server 106, the batching subsystem 110, and/or the master controller 112. The process 300 includes a first event shown in block 302 and a second event shown in block 304. Although the first event is labelled "first" and associated with a lower identification number, the second event can occur before, after, or simultaneous with the first event. The process 300 begins at block 302 wherein a first event occurs, or in other words, wherein a transaction request is received. This request can be received by the replication cluster 102 from a replication requestor 114 via the communication network 116. This request can then be forwarded to the master replication server 106, and specifically to the master controller 112.

At decision step 304, it is determined if a batch exists, or more specifically, if there is a current, unsent batch. Specifically, this includes determining if a there is an available, preexisting batch to which the transaction could be added. If it is determined that there is no currently available batch to which the transaction can be added, then the process 300 proceeds to block 306 and a new batch, which new batch is an empty batch, is created. This new batch can be created by the batch subsystem 110. After the new batch has been created, or returning to decision step 304, if it is determined that a batch already exists, the process 300 proceeds to block 308 and the transaction is added to the batch. In the event that the empty batch was created, then the transaction is added to the empty batch. Alternatively, if there is an existing batch, then the transaction is added to the existing batch. In some embodiments, this transaction can be added to the batch by the batch subsystem 110.

At decision step 310, it is determined if there are any pending acknowledgements. In some embodiments, for example, when a batch is sent to a server, an acknowledgment indicative of completion of the replication of the batch is pending. In other words, an acknowledgement is pending when the master controller 112 has not yet received confirmation of successful completion of the replication of a batch by a replication server 104 to which a batch was sent for replication. In embodiments in which multiple replication servers 104 have been selected, the step of decision step 310 can include determining whether acknowledgements from any replication servers 104 are pending. In some embodiments, for example, step 310 can include determining whether confirmation of successfully completed replication has been received from some or all of the replication servers 104.

If it is determined that there are pending acknowledgments, or in other words, that replication of the previous batch has not been completed, then the process 300 proceeds to block 312 and waits for the occurrence of either a first event as described in block 302, or a second event as described in block 314.

At block 314, a sufficient number of acknowledgements are received from replication servers 104 such that the replication of the previous batch is identified as complete. In some embodiments, the master controller 112 can receive these acknowledgements from the replication servers 104 and can determine that the replication has been successfully completed based on the received acknowledgements. When the replication has been successfully completed, the master controller 112 can, as indicated in block 316, acknowledge completion of the pending transactions to the replication request source 114. In some embodiments, this can include sending a response to the replication requestor 114, which response can indicate that the replication request has been successfully completed.

At decision step 318, and in some embodiments upon determining completion of pending transactions, it is determined whether a batch exists. In some embodiments, this can include determining whether a batch containing at least one transaction exists. If it is determined that a batch does not exist, then the process 300 proceeds to block 312 and await the occurrence of event 1. If it is determined that a batch exists at decision step 318, or returning again to decision step 310, if it is determined that there are no pending acknowledgements, or in other words, if it is determined that there is no uncompleted replication of a prior batch, the process 300 proceeds to block 320, wherein the batch is sent to some or all of the replication servers 104. In some embodiments, in which the process 300 advances to block 320 from decision step 310, this can result in the sending of a batch including only a single transaction to some or all of the replication servers 104. In some embodiments, the batch can be sent to the some or all of the replication servers 104 via the master controller. In some embodiments, and as a part of the sending of the batch to the replication servers, the master controller 112 store an indication of the outstanding batch. In some embodiments, this can include changing a value and/or a bit indicative of batch status from indicative of no outstanding batch to indicative of an outstanding batch.

With reference now to FIG., a flowchart illustrating another embodiment of a process 400 for batch-based replication is shown. The process 400 can be performed as a part of, or in the place of steps 204 through 208 of process 200 shown in FIG. 2. Further, the process 400 can be performed by the system 100, including by, for example, the replication cluster 102, the master replication server 106, the batching subsystem 110, and/or the master controller 112. The process 400 begins at block 402, wherein the master controller receives a request to replicate a transaction. This request can be received by the replication cluster 102 from a replication requestor 114 via the communication network 116. This request can then be forwarded to the master replication server 106, and specifically to the master controller 112.

At block 404, the master controller identifies one or several replication servers 104 from the replication cluster 102 to perform the requested replication. In some embodiments, this can include identifying one, some, or all of the replication servers 104 in the replication cluster 102 to perform the requested replication. In some embodiments, the process 400 can be performed multiple times by the master controller 112 and/or by batching subsystem 110 in completing a replication request. In some embodiments, for example, at step 404, the master controller 112 can select a single replication server 104, but many of the steps of process 400, including the step of block 404, can be repeated until, for example, a desired number of replication servers 104 are selected. In some embodiments, the selected replication server 104 can be or include a slave replication server 108, and in some selected replication server 104 can be or include the master replication server 106.

Once a replication server 104 has been identified and/or selected, the process 400 proceeds to decision step 406, wherein it is determined if there is any pending acknowledgement from the replication server 104 selected in block 404. In some embodiments, for example, when a batch is sent to a server, an acknowledgment indicative of completion of the replication of the batch is pending. In other words, an acknowledgement is pending when the master controller 112 has not yet received confirmation of successful completion of the replication of a batch by a replication server 104 to which a batch was sent for replication. In embodiments in which multiple replication servers 104 have been selected, the step of decision step 406 can include determining whether acknowledgements from any of the replication servers 104 identified in block 404 are pending. In some embodiments, for example, step 406 can include determining whether confirmation of successfully completed replication has been received from some or all of the replication servers 104 identified in block 404.

If it is determined that there is not pending acknowledgment from the selected server, or in other words, if it is determined that the selected server is not current processing a batch, then the process 400 proceeds to decision step 408, wherein it is determined if there is any current unsent batch for the selected server. Specifically, this includes determining if a there is an available, preexisting batch designated for the selected one or several replication servers 104 and to which the transaction could be added.

If it is determined that there is no currently available batch to which the transaction can be added, then the process 400 proceeds to block 410 and a new batch is created. This new batch can be created by the batch subsystem 110 for one or more replication servers 104 selected in block 404. After the new batch has been created, the transaction included in the request received in block 402 can be added to the batch as indicated in block 412. In some embodiments, this transaction can be added to the new batch by the batch subsystem 110.

After the transaction has been added to the new batch, the process 400 proceeds to block 414, wherein the new batch is sent to the one or more servers identified in block 04. This batch is sent in block 414, even though the batch only includes the single transaction and/or even through the batch is not full in that the batch does not contain a maximum amount of data and/or has not reached a maximum size. In some embodiments, the batch can be sent by the batch subsystem 110 and/or the batch subsystem 110 can provide the batch to the master controller 112, which master controller 112 can send the batch to the replication servers 104 identified and/or selected in block 404. In some embodiments, and as a part of sending the batch to the selected replication servers 104, an indication of the pending acknowledgment is associated with the replication server 104 receiving the batch. This can indicate that the batch has been sent to the selected one or several replication servers 104 and, for each of the selected one or several replication servers 104, can indicate that no acknowledgement of successful completion of replication of the batch has been received. The process 400 then proceeds to block 422, and waits for receipt of an additional replication request.

Returning again to decision step 408, if it is determined that there is a current unsent batch for the one or several servers selected in block 404, then the process 400 proceeds to block 416, wherein the transaction received in block 402 is added to the unsent batch. The transaction can be added to the unsent batch by the batch subsystem 110.

At block 418, the current unsent batch is sent to the one or several replication servers 104 identified in block 404. This batch is sent regardless of whether the batch has or has not reached a maximum batch size, but is sent because of the receipt of confirmation of the completion of the replication of an immediately prior sent batch by the one or several servers identified in block 404. Thus, the sending of the batch is triggered by receipt of confirmation of the completion of the replication of an immediately prior sent batch, and in some embodiments, the batch being sent is smaller than a maximum batch size. Further, as the timing of the sending of the batch is based on the receipt of confirmation of the completion of the replication of an immediately prior sent batch, the size of the batch being sent and/or the size of any unsent batch varies based on a timing of receipt of the acknowledgement of completion of the replication of the immediately prior sent batch and a rate at which replication requests are received.

In some embodiments, the batch can be sent by the batch subsystem 110, and/or the batch subsystem 110 can provide the batch to the master controller 112, which master controller 112 can send the batch to the replication servers 104 identified and/or selected in block 404. In some embodiments, and as a part of sending the batch to the selected replication servers 104, an indication of the pending acknowledgment is associated with the one or several replication servers 104 receiving the batch. This can indicate that the batch has been sent to the selected one or several replication servers 104 and, for each of the selected one or several replication servers 104, can indicate that no acknowledgement of successful completion of replication of the batch has been received. The process 400 then proceeds to block 422, and waits for receipt of an additional replication request.

Returning again to decision step 406, if it is determined that there is a pending acknowledgement from the one or several replication servers 104 identified in block 404, or in other words, that confirmation has not been received of successful completion of replication of an immediately prior sent batch, the process 400 proceeds to block 420, wherein the transaction received in block 402 is added to a batch. In some embodiments in which a current unsent batch has already been created, then the transaction received in block 402 is added to the current unsent batch. In embodiments in which there is no current unsent batch, then a new batch is created and the transaction is added to the new batch. The transaction can be added to the batch, and/or the new batch can be created by the batch subsystem 110.

After the transaction has been added to the batch, the process 400 proceeds to block 422 and waits for additional requests and/or awaits the receipt of confirmation of successful replication of the immediately prior sent batch, at which time the current unsent batch is sent to the replication servers 104 identified in block 404.

In some embodiments, the process 400 can be repeatedly performed as multiple replication requests are received. For example, the process 400 may be performed a first time for a first replication request, which performing of process 400 may include steps 402-414 and 422 and may form a first batch, which first batch is a new batch. The process 400 may also be performed including steps 402-414 and 422 for a first replication request and with a first batch, then may be performed including steps 402-408, 416, 318, and 422 for a second replication request and with a second batch, and/or then may be performed including steps 402-406, 420, and 422 for a third replication request and with a third batch.

Figure 4:
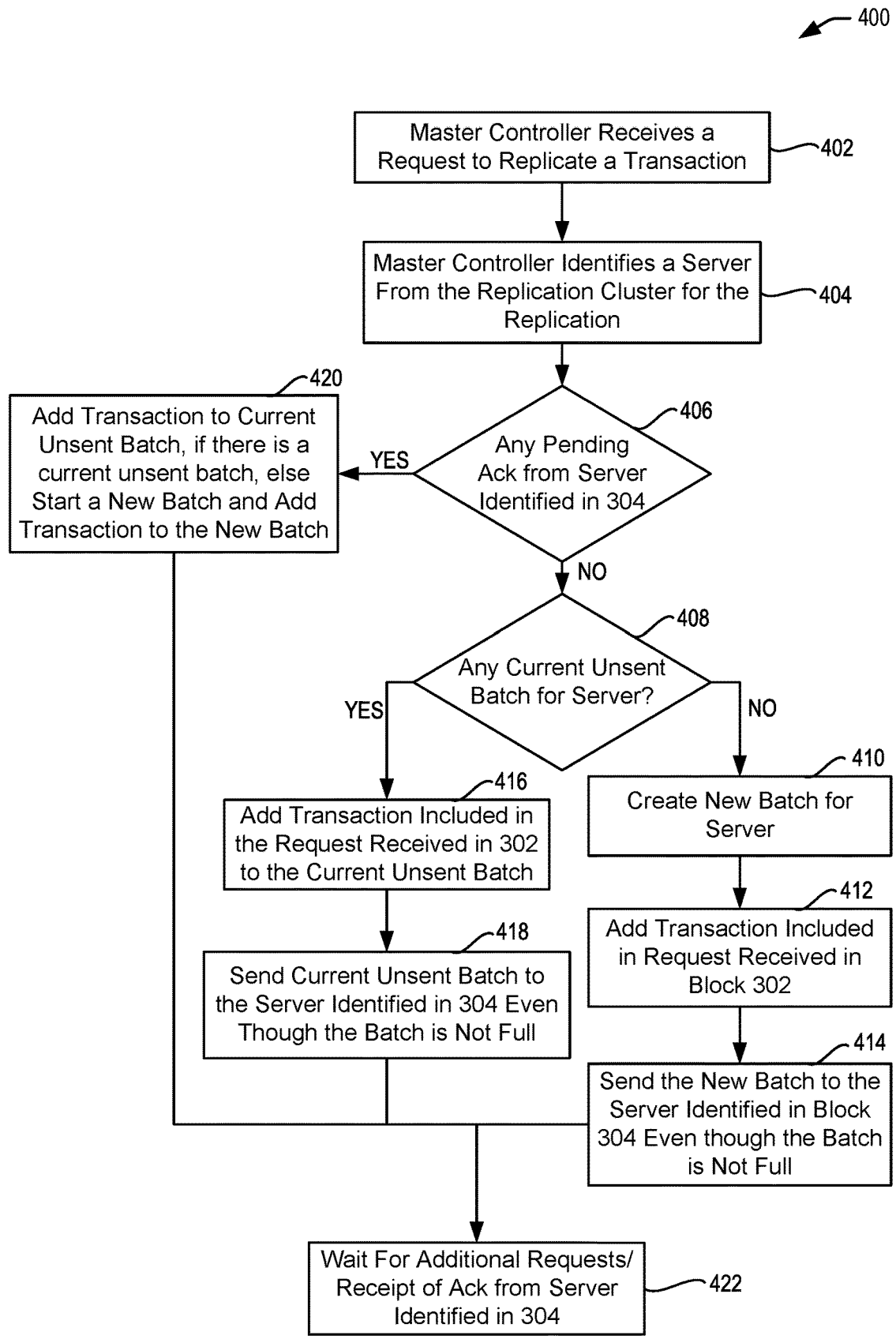
FIG. 4 is a flowchart illustrating another embodiment of a process for batch-based replication.
Figure 5:
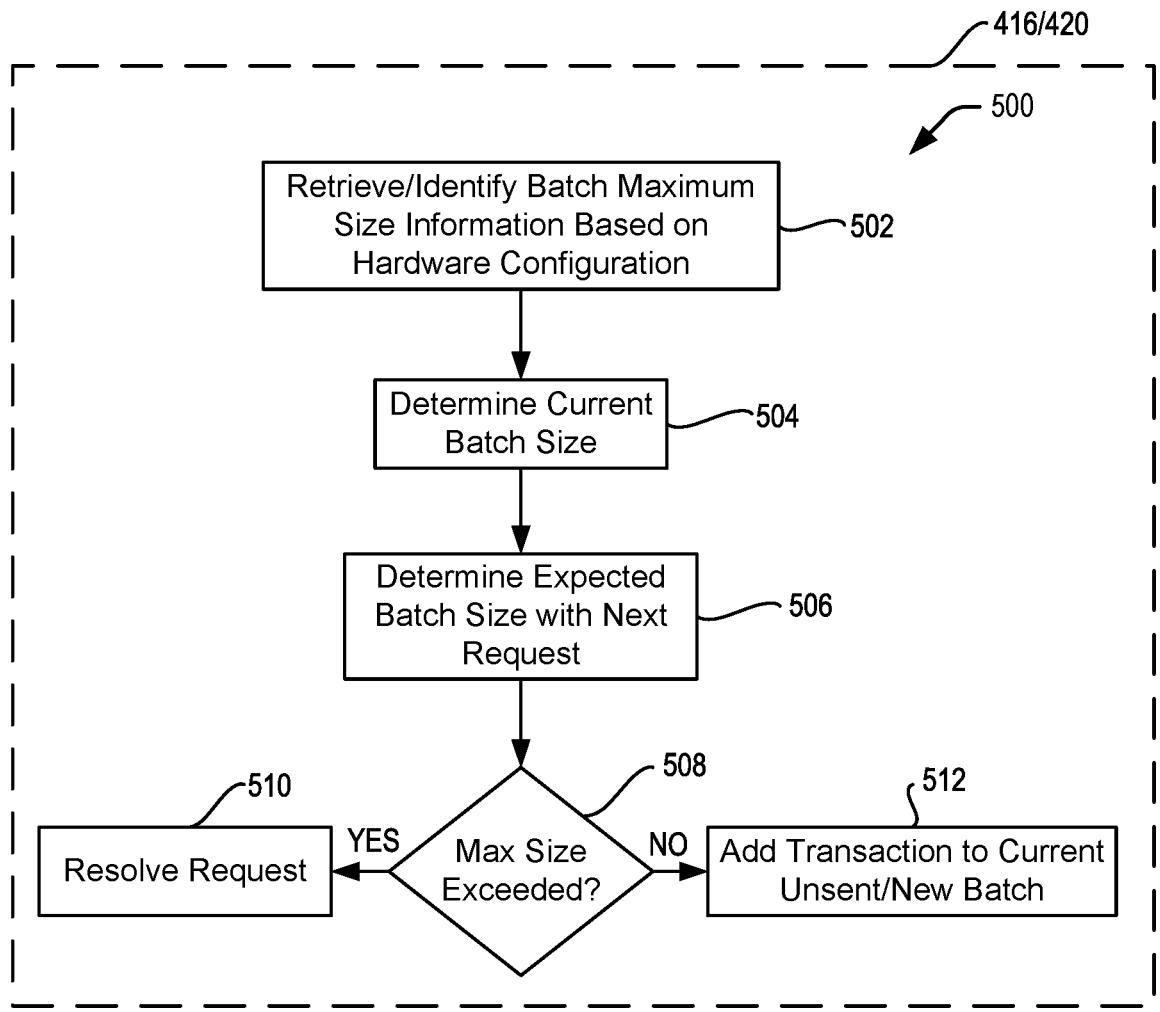
FIG. 5 is a flowchart illustrating one embodiment of a process for adding a transaction to a batch.

With reference now to FIG. 5, a flowchart illustrating one embodiment of a process 500 for adding a transaction to a batch is shown. In some embodiments, the process 500 can be performed as a part of, or in the place of the steps of blocks 416 and/or 420 of FIG. 4. The process 500 begins at block 502, wherein a maximum batch size for the one or several servers identified in block 404 of FIG. 4 is identified and/or retrieved. In some embodiments, this can include retrieving information identifying a maximum batch size, which information can be, for example, included in or with the cluster replication information 113.

In some embodiments, this maximum batch size can be identified based on a hardware configuration and/or based on one or several features of the selected one or several replication servers 104. Specifically, in some embodiments, identifying the maximum size for the current unsent batch can include determining a hardware attribute of some or all of the one or several replication servers 104 selected in block 404, and identifying a maximum batch size based on the hardware attribute of these some or all of the one or several replication servers 104 selected in block 404.

In some embodiments, this attribute can include an amount of random access memory ("RAM") of each of the some of the one or several replication servers 104 selected in block 404. In some embodiments in which the some of the one or several replication servers 104 have different amounts of RAM, the smallest amount of RAM of any of the some of the one or several replication servers 104 can be selected for use in determining the maximum batch size. In some embodiments, the maximum batch size can be determined as the batch size equal to a predetermined fraction or percent of the amount of RAM. In some embodiments, the maximum batch size can be, for example, 10% of the amount of RAM, 20% of the amount of RAM, 30% of the amount of RAM, 40% of the amount of RAM, 50% of the amount of RAM, 60% of the amount of RAM, or any other or intermediate percent of the amount of RAM. In some embodiments, the maximum batch size can be between 10% and 60% of the amount of RAM, between 20% and 40$ of the maximum amount of RAM, or between any other or intermediate percentages of the amount of RAM.

At block 504, the current batch size is determined. In some embodiments, the batching subsystem 110 can determine the current batch size, which current batch size can be based on the transactions that have been added to the batch. At block 506, the expected batch size after addition of the transaction received in block 402 is determined. This expected batch size can be determined by the batching subsystem 110, and can be determined by adding the size of the transaction received in block 402 to the current batch size determined in block 404.

At decision step 508, it is determined if the maximum batch size is exceeded. In some embodiments, this can include comparing the expected batch size to the maximum size allowable for the batch. If the expected batch size exceeds the maximum allowable size, then the process 500 proceeds to block 510, wherein the replication request is resolved. In some embodiments, this can include determining not to add the transaction to the batch, and to, in some embodiments, hold the transaction for the next batch, to reject the replication request, and/or to request the resending of the replication request. After the resolution of the replication request in block 510, the process 500 proceeds to block 418 if process 500 is performed in block 416, or to block 422 if the process 500 is performed in block 420.

The determination that the maximum batch size is, or would be exceeded does not, in some embodiments, trigger sending of the batch. Rather, the full batch waits until receipt of an acknowledgement confirmation successful completion of replication of the immediately prior sent batch, and the full batch is then sent.

Returning again to decision step 508, if it is determined that the maximum allowable batch size is not and/or will not be exceeded, then the process 500 proceeds to block 512, wherein the transaction received in block 402 is added to the current unsent batch and/or to the new batch. The process 500 then proceeds to block 418 if process 500 is performed in block 416, or to block 422 if the process 500 is performed in block 420.

Example Implementation

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
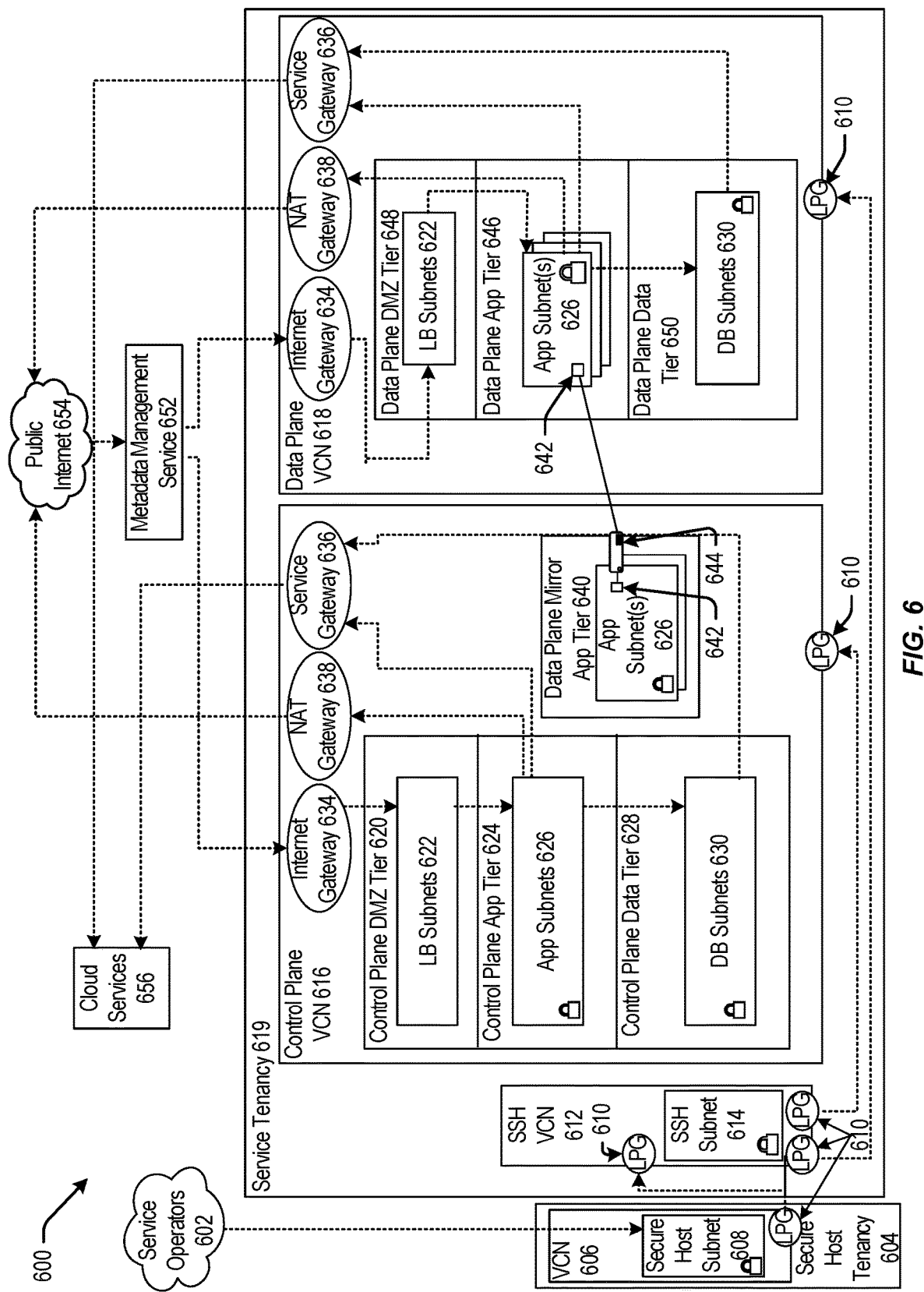
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep security breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway @136 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier @146, a data plane DMZ tier 648, and a data plane data tier 650. The data plane DMZ tier 650 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plan VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of security, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
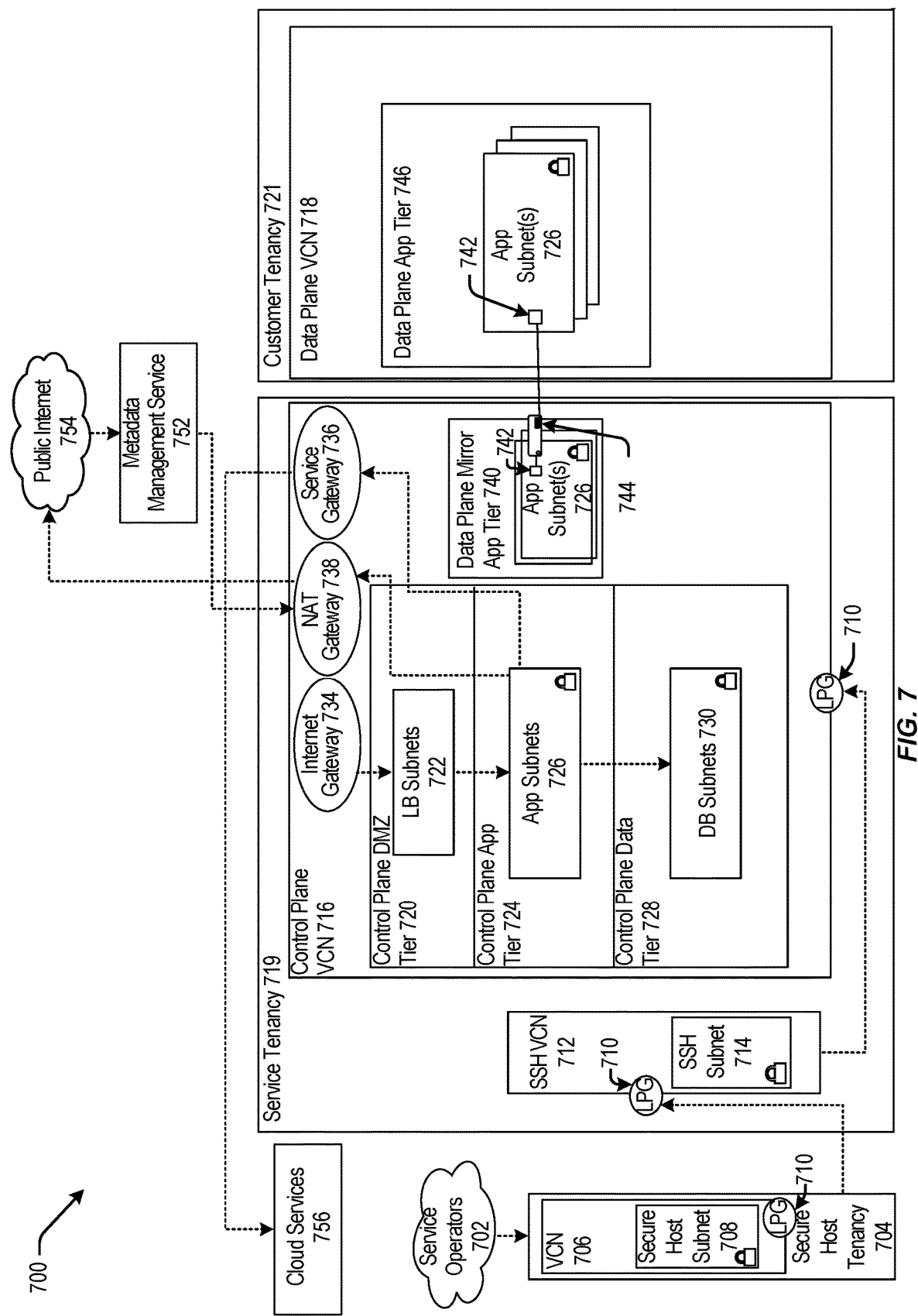
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 640 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plan app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 728 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 1," may be located in Region 1 and in "Region 2." If a call to Deployment 1 is made by the service gateway 736 contained in the control plane VCN 716 located in Region 1, the call may be transmitted to Deployment 1 in Region 1. In this example, the control plane VCN 716, or Deployment 1 in Region 1, may not be communicatively coupled to, or otherwise in communication with, Deployment 1 in Region 2.

Figure 8:
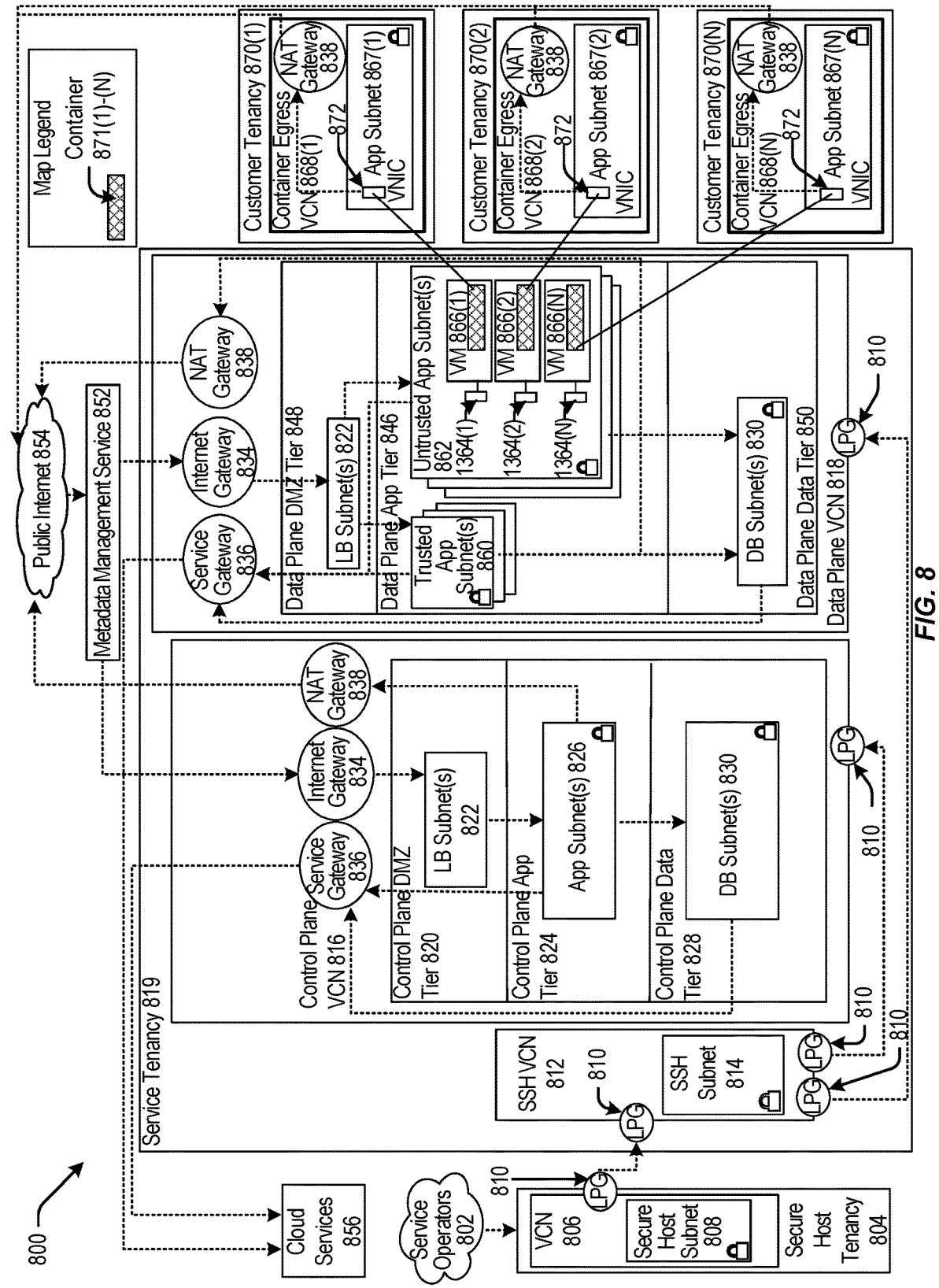
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 804 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs @368(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 818 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
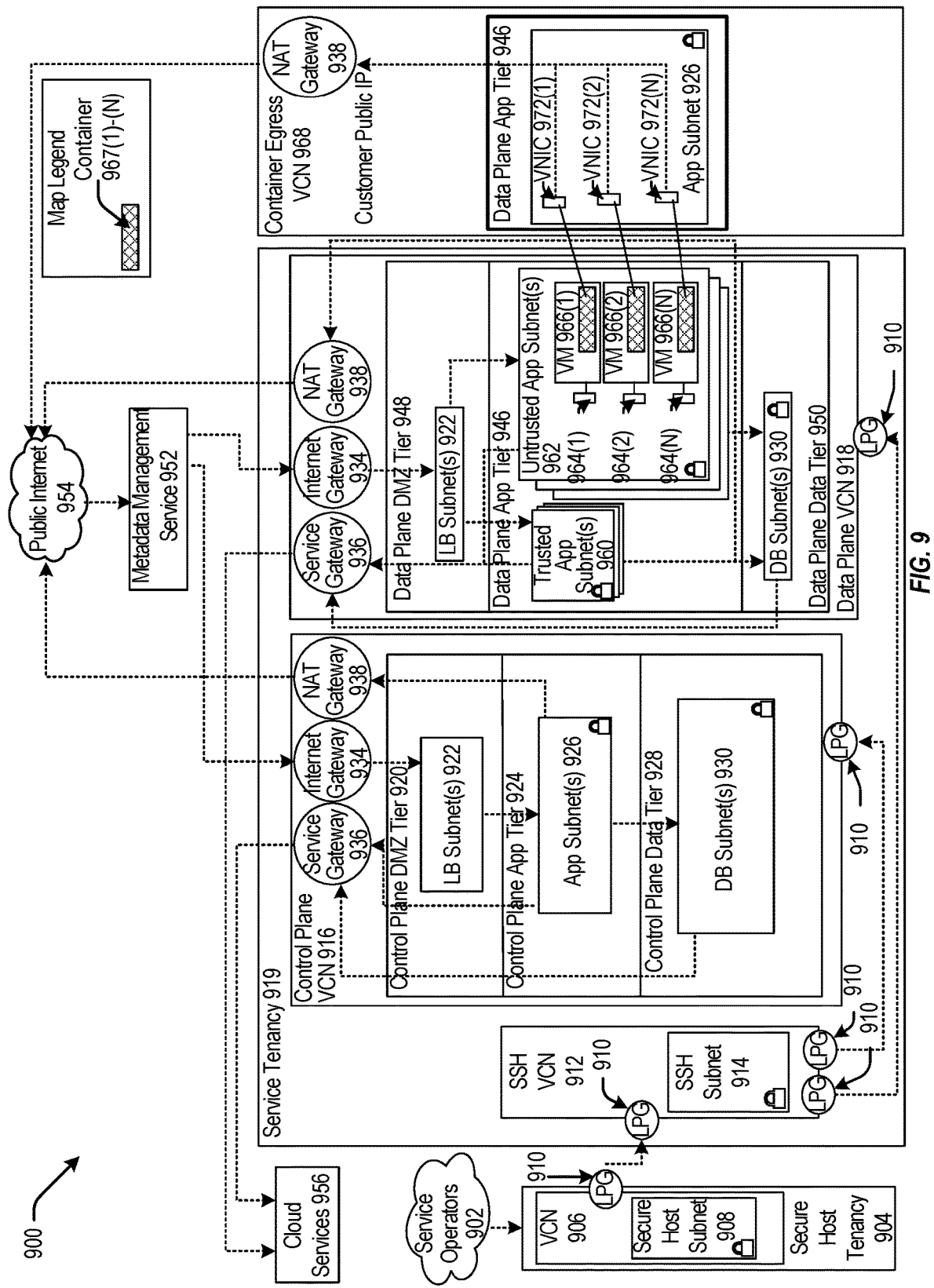
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN @468. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
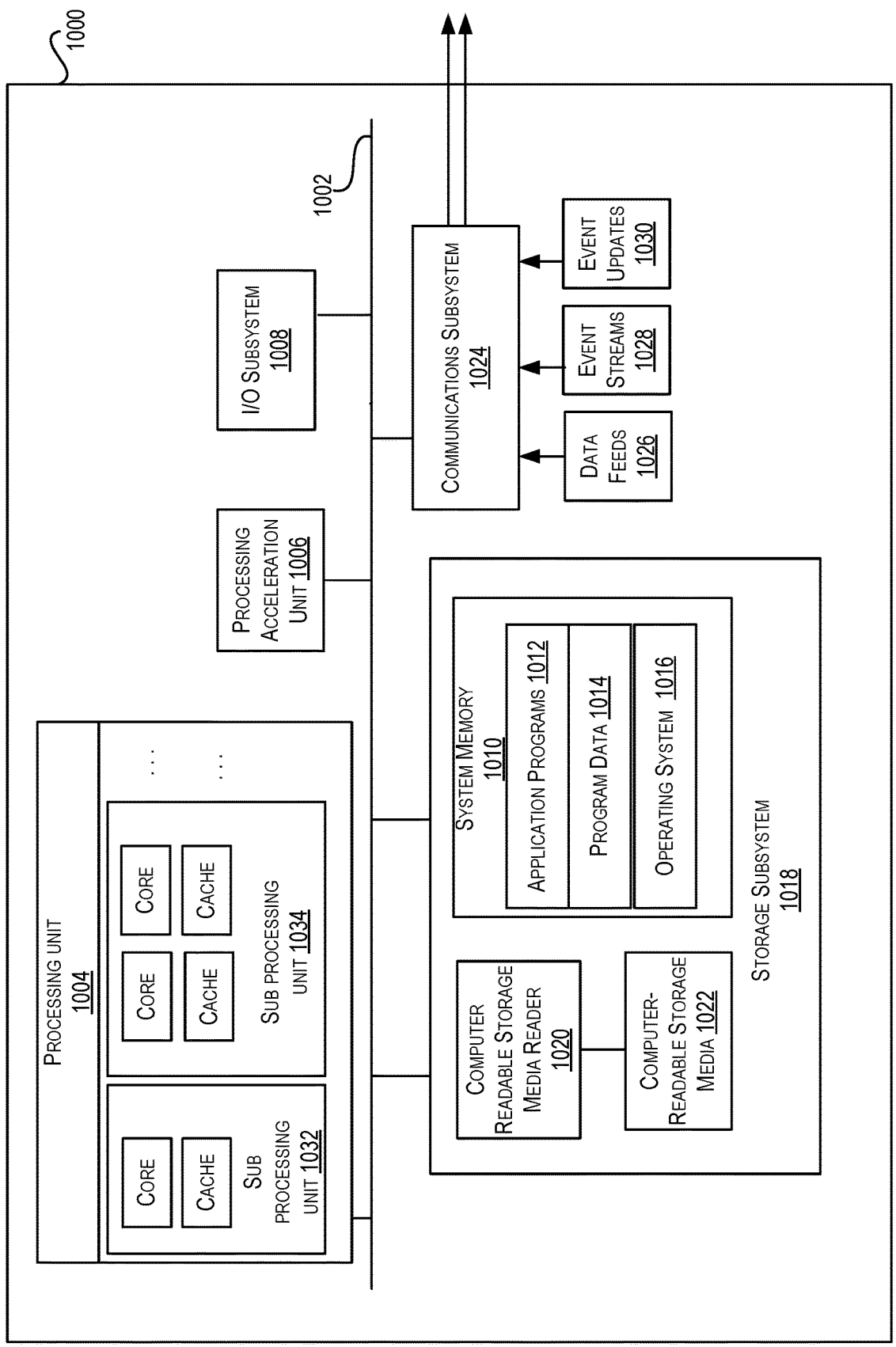
FIG. 10 is a block diagram illustrating an example computer system, according

FIG. 10 illustrates an example computer system 1000, in which various embodiments of the present disclosure may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system @500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® @5 OS, and Palm® OS operating systems.

(Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader @520 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments.

Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   receiving a first request to replicate a first transaction at a master controller from a replication requestor;
   executing a batching process with the master controller to replicate the first transaction on at least some of a plurality of servers in a replication cluster, executing the batching process to replicate the first transaction comprising:
   selecting with the master controller a first server for replication of the first transaction from the replication cluster;
   determining that a pending acknowledgement from the selected first server has not been identified;
   adding the first transaction to a new first batch for the first server; and
   sending the new first batch to the first server selected for replication of the first transaction, wherein the first transaction is an only transaction in the new first batch; and
   receiving a second request to replicate a second transaction at the master controller;
   executing the batching process with the master controller to replicate the second transaction on at least some of the plurality of servers in the replication cluster, wherein executing the batching process to replicate the second transaction on at least some of the plurality of servers in the replication cluster comprises adding the second transaction to a second batch for the first server, the second batch comprising a plurality of transactions;
   receiving with the master controller an acknowledgement indicative of completion of replication of the first transaction from each of the at least some of the plurality of servers in the replication cluster; and
   sending the second batch, wherein the sending of the second batch is triggered by receipt of the acknowledgement indicative of completion of replication of the first transaction from each of the at least some of the plurality of servers.

2. The method of claim 1, further comprising sending with the master controller a response to the replication requestor indicating completion of the replication.

3. The method of claim 2, further comprising determining completion of the replication when a value associated with the received acknowledgment indicative of completion of replication meets or exceeds a threshold value.

4. The method of claim 1, wherein the batching process is executed by the master controller for each of the plurality of servers in the replication cluster.

5. The method of claim 4, wherein executing the batching process causes the master controller to, for each of the plurality of servers in the replication cluster, send the first transaction in a batch to each of the plurality of servers in the replication cluster.

6. The method of claim 5, wherein at least some of the batches sent to different servers in the plurality of servers in the replication cluster are non-identical.

7. The method of claim 1, further comprising: determining that no current unsent batch is available for the first server; and creating the new first batch for the first server.

8. The method of claim 7, wherein the plurality of transactions included in the second batch are received subsequent to the sending of the new first batch to the first server selected for replication of the first transaction.

9. The method of claim 8, wherein the batching process for the second request further comprises:
   selecting with the master controller the first server for replication of the second transaction from the replication cluster;
   determining that an acknowledgement of completion of previous batch processing has been received from the selected first server; and
   identifying the second batch for the first server, wherein the second batch comprises a current unsent batch.

10. The method of claim 9, wherein a size of the second batch varies based on a timing of receipt of the acknowledgement indicative of completion of replication.

11. The method of claim 9, wherein the second batch is not full when sent to the first server.

12. The method of claim 9, wherein adding the second transaction to the second batch for the first server comprises determining that the adding of the second transaction to the second batch does not increase a size of the second batch beyond a maximum size.

13. The method of claim 12, wherein adding the second transaction to the second batch for the first server comprises:
   identifying a maximum size for the second batch;
   identifying the size of the second batch after the adding of the second transaction;
   determining that the adding of the second transaction to the second batch does not exceed the maximum size for the second batch; and
   adding the second transaction to the second batch.

14. The method of claim 13, wherein identifying the maximum size for the second batch comprises retrieving information identifying a maximum batch size for the first server.

15. The method of claim 13, wherein identifying the maximum size for the second batch comprises:
    determining a hardware attribute of the first server; and
    identifying a maximum batch size based on the hardware attribute of the first server.

16. The method of claim 15, wherein the hardware attribute comprises an amount of random access memory of the first server.

17. The method of claim 1, wherein the master controller is a subsystem within one of the plurality of servers in the replication cluster.

18. The method of claim 17, wherein the first server comprises the one of the plurality of servers in the replication cluster containing the master controller.

19. A non-transitory computer-readable storage medium storing a plurality of instructions executable by one or more processors, the plurality of instructions when executed by the one or more processors cause the one or more processors to:
    receive a first request to replicate a first transaction at a master controller from a replication requestor;
    execute a batching process with the master controller to replicate the first transaction on at least some of a plurality of servers in a replication cluster, executing the batching process to replicate the first transaction comprising:
        selecting with the master controller a first server for replication of the first transaction from the replication cluster;
        determining that a pending acknowledgement from the selected first server has not been identified;
        adding the first transaction to a new first batch for the first server; and
        sending the new first batch to the first server selected for replication of the first transaction, wherein the first transaction is an only transaction in the new first batch;
    receive a second request to replicate a second transaction at the master controller;
    execute the batching process with the master controller to replicate the second transaction on at least some of the plurality of servers in the replication cluster, wherein executing the batching process to replicate the second transaction on at least some of the plurality of servers in the replication cluster comprises adding the second transaction to a second batch for the first server, the second batch comprising a plurality of transactions;
    receive with the master controller an acknowledgement indicative of completion of replication of the first transaction from each of the at least some of the plurality of servers in the replication cluster; and
    send the second batch, wherein the sending of the second batch is triggered by receipt of the acknowledgement indicative of completion of replication of the first transaction from each of the at least some of the plurality of servers.

20. A system comprising:
    a replication cluster comprising:
        a plurality of servers; and
        a master controller configured to:
            receive a first request to replicate a first transaction from a replication requestor;
            execute a batching process to replicate the first transaction on at least some of the plurality of servers in the replication cluster, executing the batching process to replicate the first transaction comprising:
                selecting a first server for replication of the first transaction from the replication cluster;
                determining that a pending acknowledgement from the selected first server has not been identified;
                adding the first transaction to a first batch for the first server; and
                sending the first batch to the first server selected for replication of the first transaction, wherein the first transaction is an only transaction in the first batch;
            receive a second request to replicate a second transaction at the master controller;
            execute the batching process with the master controller to replicate the second transaction on at least some of the plurality of servers in the replication cluster, wherein executing the batching process to replicate the second transaction on at least some of the plurality of servers in the replication cluster comprises adding the second transaction to a second batch for the first server, the second batch comprising a plurality of transactions;
            receive an acknowledgement indicative of completion of replication of the first transaction from each of the at least some of the plurality of servers in the replication cluster; and
            send the second batch, wherein the sending of the second batch is triggered by receipt of the acknowledgement indicative of completion of replication of the first transaction from each of the at least some of the plurality of servers.

* * * * *

UNITED STATES PATENT AND TRADEMARK OFFICE
CERTIFICATE OF CORRECTION

| | |
|---|---|
| PATENT NO. | : 11,681,666 B2 |
| APPLICATION NO. | : 17/007972 |
| DATED | : June 20, 2023 |
| INVENTOR(S) | : Andrey Efimov |

It is certified that error appears in the above-identified patent and that said Letters Patent is hereby corrected as shown below:

In the Specification

In Column 4, Line 32, Delete "according" and insert -- according to at least one embodiment. --.

In Column 5, Lines 6-7, Delete "By maintaining strict order of replication requests,".

In Column 14, Line 35, Delete "like." and insert -- like). --.

In Column 24, Lines 26-29, Delete "(EISA) bus, Video Electronics Standards Association (VESA) local bus, and Peripheral Component Interconnect (PCI) bus, which can be implemented as a Mezzanine bus manufactured to the IEEE P1386.1 standard." and insert the same on Column 24, Line 25, as a continuation of same paragraph.

In Column 26, Line 4, Delete "(Storage" and insert -- Storage --.

Signed and Sealed this
Second Day of April, 2024

*Katherine Kelly Vidal*
*Director of the United States Patent and Trademark Office*